US010161677B2

(12) United States Patent
Nakano

(10) Patent No.: US 10,161,677 B2
(45) Date of Patent: Dec. 25, 2018

(54) DRYER

(71) Applicant: TOYOTA JIDOSHA KABUSHIKI KAISHA, Toyota-shi, Aichi-ken (JP)

(72) Inventor: Takahiko Nakano, Seto (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 323 days.

(21) Appl. No.: 15/250,105

(22) Filed: Aug. 29, 2016

(65) Prior Publication Data

US 2017/0067688 A1  Mar. 9, 2017

(30) Foreign Application Priority Data

Sep. 3, 2015  (JP) .................. 2015-173597

(51) Int. Cl.
| | |
|---|---|
| *F26B 13/10* | (2006.01) |
| *F26B 21/00* | (2006.01) |
| *H01M 4/04* | (2006.01) |
| *H01M 4/139* | (2010.01) |

(52) U.S. Cl.
CPC .......... *F26B 13/108* (2013.01); *F26B 21/004* (2013.01); *H01M 4/04* (2013.01); *H01M 4/139* (2013.01)

(58) Field of Classification Search
CPC ....... F26B 13/108; F26B 21/004; H01M 4/04; H01M 4/139
USPC .......................................................... 34/620
See application file for complete search history.

(56) References Cited

U.S. PATENT DOCUMENTS

| | | | | |
|---|---|---|---|---|
| 3,557,469 A * | 1/1971 | Edington | ............. | G03D 15/022 34/620 |
| 4,389,562 A * | 6/1983 | Chaudoir | ................. | A21B 1/22 219/388 |
| 5,181,330 A * | 1/1993 | Schoch | .................... | B31F 1/285 156/272.2 |
| 5,259,124 A * | 11/1993 | Poterala | .................. | F26B 13/10 34/242 |
| 6,928,753 B2 * | 8/2005 | Richter | ................... | B21B 27/10 34/620 |
| 7,254,902 B2 * | 8/2007 | Hayasaka | ............. | B41F 23/044 101/416.1 |

(Continued)

FOREIGN PATENT DOCUMENTS

| | | | | |
|---|---|---|---|---|
| CA | 2823007 A1 * | 7/2012 | ............. | F26B 13/10 |
| JP | 5892781 A | 6/1983 | | |

(Continued)

*Primary Examiner* — Stephen M Gravini

(74) *Attorney, Agent, or Firm* — Sughrue Mion, PLLC

(57) ABSTRACT

A dryer dries a strip-shaped object to be dried by directing stream of air toward the object while conveying the object in a conveyance direction. The dryer includes a loading and conveying unit that conveys the object and a blowing box arranged above the loading and conveying unit and including an outlet through which the stream of air is blown toward the loading and conveying unit. The loading and conveying unit includes a roller, supporting portions rotatably supporting the roller. The blowing box is positioned above the loading and conveying unit and formed in a box shape extending in the width direction, the blowing box including a box body that forms the outlet and accommodates air and positioning portions that determine a position of the box body in the vertical direction.

3 Claims, 5 Drawing Sheets

(56) References Cited

U.S. PATENT DOCUMENTS

| | | | |
|---|---|---|---|
| 8,110,131 B1* | 2/2012 | Dell'Orco | B29B 17/02 264/141 |
| 2004/0045676 A1* | 3/2004 | Chojnacki | B65C 9/0015 156/350 |
| 2004/0181967 A1* | 9/2004 | Fujinami | F26B 13/10 34/620 |
| 2010/0038022 A1* | 2/2010 | Lapelosa | B41F 17/006 156/238 |
| 2011/0023323 A1* | 2/2011 | Harle | B41F 23/0426 34/620 |
| 2014/0033564 A1* | 2/2014 | Cerciello | F26B 13/10 34/620 |
| 2017/0067688 A1* | 3/2017 | Nakano | F26B 13/108 |

FOREIGN PATENT DOCUMENTS

| | | | |
|---|---|---|---|
| JP | 2002-025544 A | 1/2002 | |
| JP | 2002-170556 A | 6/2002 | |
| JP | 2013-24545 A | 2/2013 | |
| JP | 2015-060647 A | 3/2015 | |
| JP | 2015-076248 A | 4/2015 | |
| WO | WO 2012095791 A1 * | 7/2012 | F26B 13/10 |

* cited by examiner

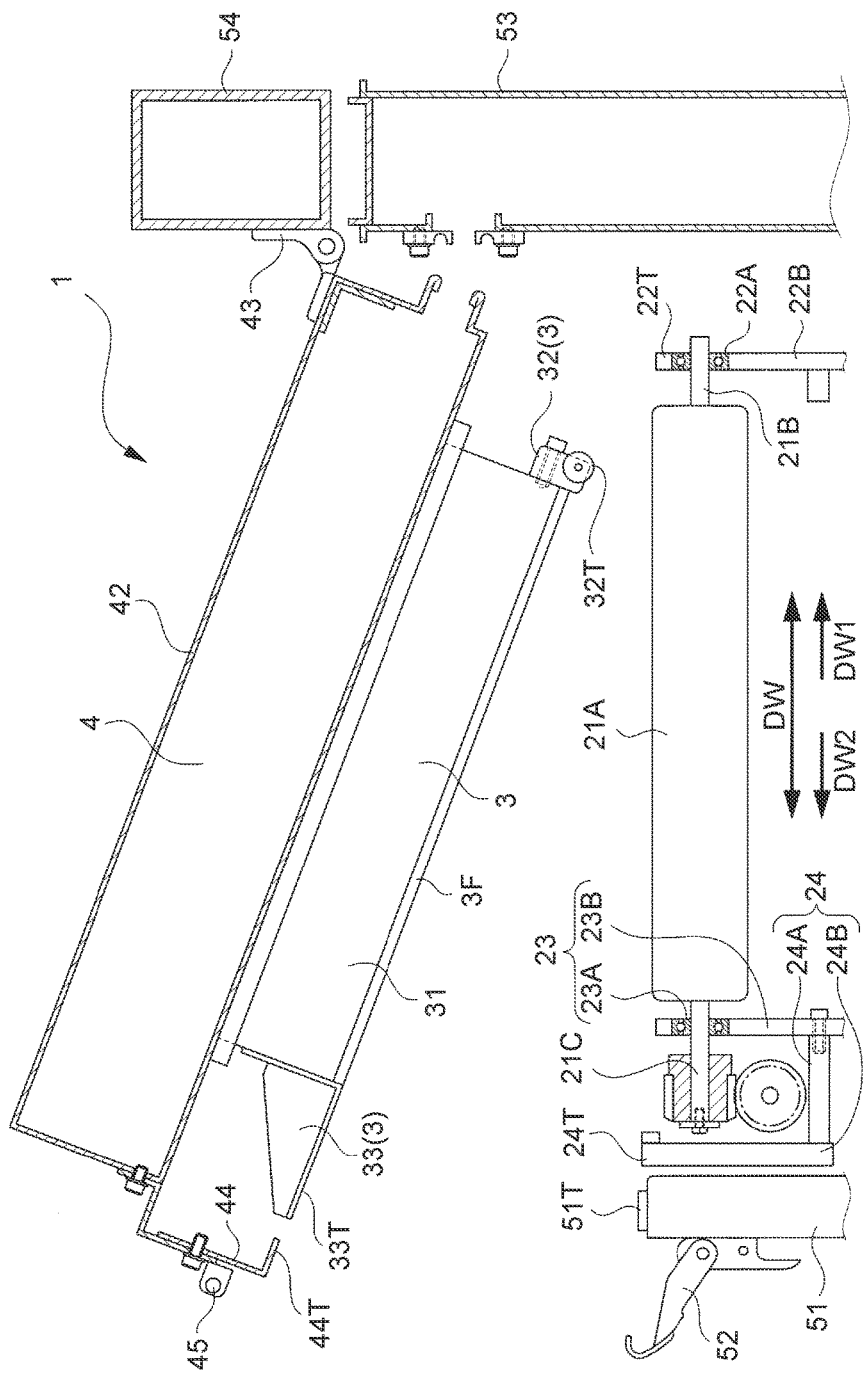

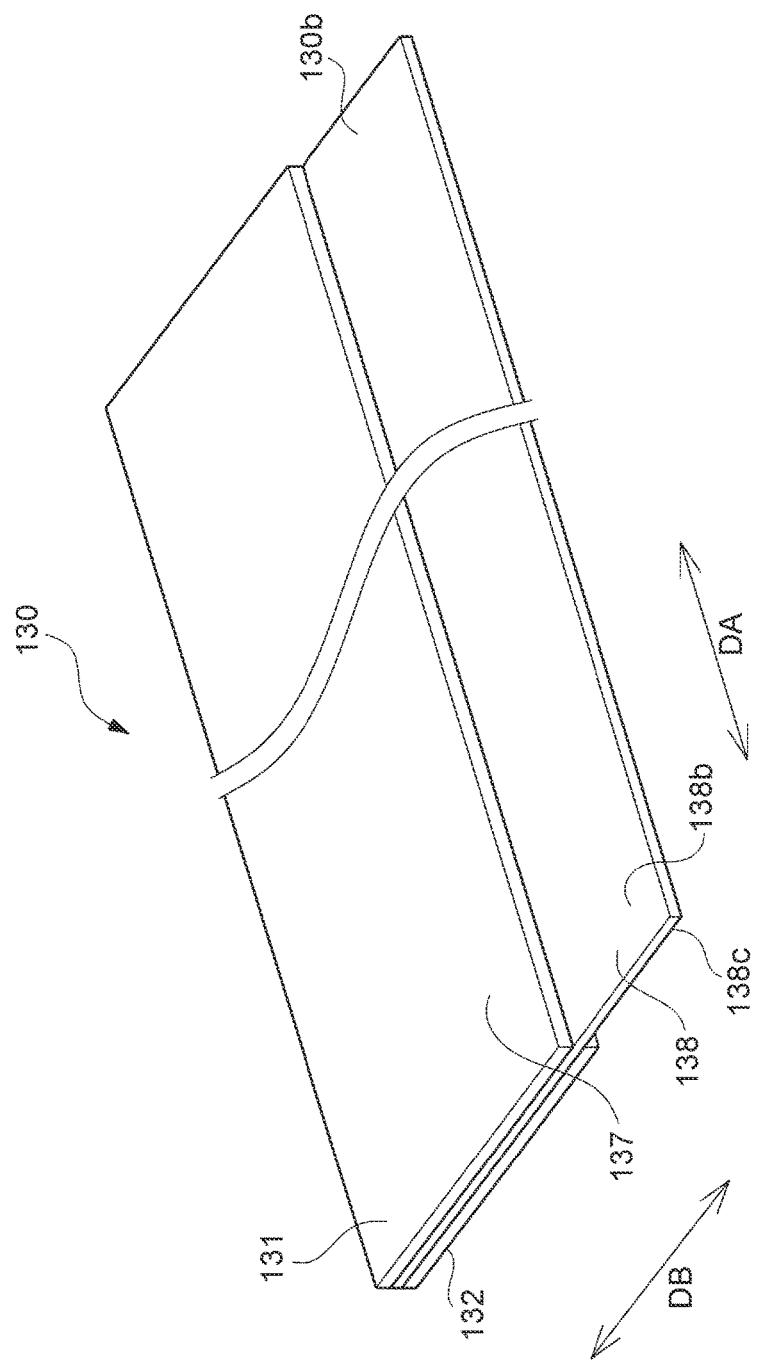

DRYER

INCORPORATION BY REFERENCE

The disclosure of Japanese Patent Application No. 2015-173597 filed on Sep. 3, 2015 including the specification, drawings and abstract is incorporated herein by reference in its entirety.

BACKGROUND

1. Technical Field

The present disclosure relates to a dryer for drying a strip-shaped object to be dried while conveying the object.

2. Description of Related Art

Some dryers are used to dry a strip-shaped object to be dried. For example, a dryer that blows hot air to dry an object is used in an electrode plate manufacturing step of a cell manufacturing method, in particular, in a step of drying active material paste applied to a current collector plate (see Japanese Patent Application Publication Nos. 2002-170556 and 2015-076248).

Such a dryer is, however, structured such that a blowing box that contains heated air pumped into the box and blows the heated air through an outlet is fastened to a retaining member with a bolt passed through a slit formed on the retaining member and a nut, and the position of the blowing box is adjusted by the bolt and nut. This structure makes it difficult to adjust the distance between the conveying roller and strip-shaped object to be dried (e.g., a strip-shaped current collector plate having active material paste applied on the plate) that is loaded on and conveyed by the roller and the hot-air outlet, and leads to reduced accuracy of the dimension of the distance. Thus, it is difficult to keep the distance with high accuracy across the entire width direction. The dryer, therefore, dries the object to be dried (e.g., the applied active material paste layer) by blowing an ample amount of hot air that is more than enough for drying the object, to the object.

SUMMARY

Generation of the large amount of hot air consumes a lot of electricity and it is costly to remove solvent from hot air that has been used for the drying process and contains the solvent and others. The disclosed embodiments provide a dryer that defines the vertical distance between a strip-shaped object to be dried and an outlet of a stream of air with high accuracy.

A dryer according to an aspect relates to a dryer that dries a strip-shaped object to be dried by directing stream of air toward the object while conveying the object in a conveyance direction, the dryer including a loading and conveying unit on which the object to be dried is loaded and which conveys the object to be dried in the conveyance direction and a blowing box arranged above the loading and conveying unit and extending in a width direction that is orthogonal to the conveyance direction, the blowing box accommodating air pumped into the blowing box, the blowing box including an outlet through which the air is blown toward the loading and conveying unit as the stream of air. The loading and conveying unit includes a roller on which the object to be dried is loaded, the roller having a roller axis extending in the width direction, a first supporting portion rotatably supporting an end of the roller on one widthwise direction side, and a second supporting portion rotatably supporting an end of the roller on the other widthwise direction side.

The blowing box includes a box body positioned above the loading and conveying unit and formed in a box shape extending in the width direction, the box body including the outlet and accommodating the pumped air, a first positioning portion including a first abutting portion that abuts against a first abutted portion of the first supporting portion or of a fixed member fixed to the first supporting portion, from above, the first positioning portion determining a vertical position of a part of the box body on one widthwise direction side, and a second positioning portion including a second abutting portion that abuts against a second abutted portion of the second supporting portion or of a fixed member fixed to the second supporting portion, from above, the second positioning portion determining a vertical position of a part of the box body on the other widthwise direction side.

The dryer in the aspect includes, as the loading and conveying unit, the roller on which the object to be dried is loaded and which determines the vertical position of the object, and the first and second supporting portions that rotatably support the roller. The blowing box includes the first positioning portion having the first abutting portion that abuts against the first abutted portion of the first supporting portion or the fixed member from above and the second positioning portion having the second abutting portion that abuts against the second abutted portion of the second supporting portion or the fixed member from above, in addition to the box body. As a result, the vertical positions of the box body is determined at both one and the other widthwise direction side parts. In other words, the vertical positions of the roller and the object to be dried loaded on the roller are determined with high accuracy by determining the positions with reference to the first supporting portion and the second supporting portion that support the roller. At the same time, the vertical positions of the box body and the outlet of the box body are also determined with high accuracy by determining the positions with reference to the first and second supporting portions. Thus, the dryer is structured such that the vertical distance between the roller or the object to be dried and the outlet of the box body can be determined with high accuracy across the entire width direction, through the common first and second supporting portions.

The dryer of the aspect may further include a cover unit positioned above the loading and conveying unit and the blowing box, the cover unit being configured to cover the loading and conveying unit and the blowing box and to be able to move upward. The cover unit may be configured to lift the box body when moved upward and to elastically press the box body downward when closed.

According to the aspect, the box body is lifted as the cover unit is moved upward, so that this makes it easy, for example, to inspect the object to be dried under conveyance, the roller, or other components and to remove foreign substances. Meanwhile, when the cover unit is lowered, the first abutting portion of the blowing box lowered with the cover unit again abuts against the first abutted portion of the first supporting portion or the fixed member from above to determine the vertical position of the part of the box body on the one widthwise direction side. Also, the second abutting portion of the blowing box abuts against the second abutted portion of the second supporting portion or the fixed member from above to determine the vertical position of the part of the box body on the other widthwise direction side. This makes it possible to determine the vertical distance between the roller, and the box body and the outlet of the box body again with high accuracy across the entire width direction. In addition, because the cover unit elastically presses the box body, the first abutting portion of the blowing box and the second abutting portion of the blowing box are respectively abutted against (pressed against) the first abutted portion and the second abutted portion further firmly, so that the positions of the abutment locations hardly vary. Moreover, because the blowing box (box body) is elastically sandwiched between the cover unit, and the first abutted portion and the second abutted portion, the position of the blowing box is stabilized, thereby also stabilizing the position of the outlet of the box body. This makes it possible to determine the vertical distance between the roller and the object to be dried, and the outlet of the box body with higher accuracy across the entire width direction.

In the aspect, the vertical position of the abutment between the first abutted portion and the first abutting portion may be adjusted by interposing a plate member between the first abutted portion and the first abutting portion or in other ways. Similarly, the vertical position of the abutment between the second abutted portion and the second abutting portion may be adjusted by interposing a plate member between the second abutted portion and the second abutting portion or in other ways. In this way, the vertical positions and the inclination in the width direction of the box body and the outlet of the box body can be adjusted easily. Accordingly, the vertical distance between the roller and the object to be dried, and the outlet of the box body can also be adjusted easily.

An elastic member such as a leaf spring made from a metal plate or a resin plate, or a helical spring may be used for elastically pressing the box body with the cover unit. The material of the elastic member may be selected in accordance with the conditions such as the temperature to which the elastic member is exposed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 illustrates the dryer according to the embodiment with a cover unit and a blowing box moved upward; and FIG. 5 is a perspective view of an electrode plate that has been dried with the dryer according to the embodiment and cut in half in a width direction.

DETAILED DESCRIPTION OF EMBODIMENTS

Figure 1:
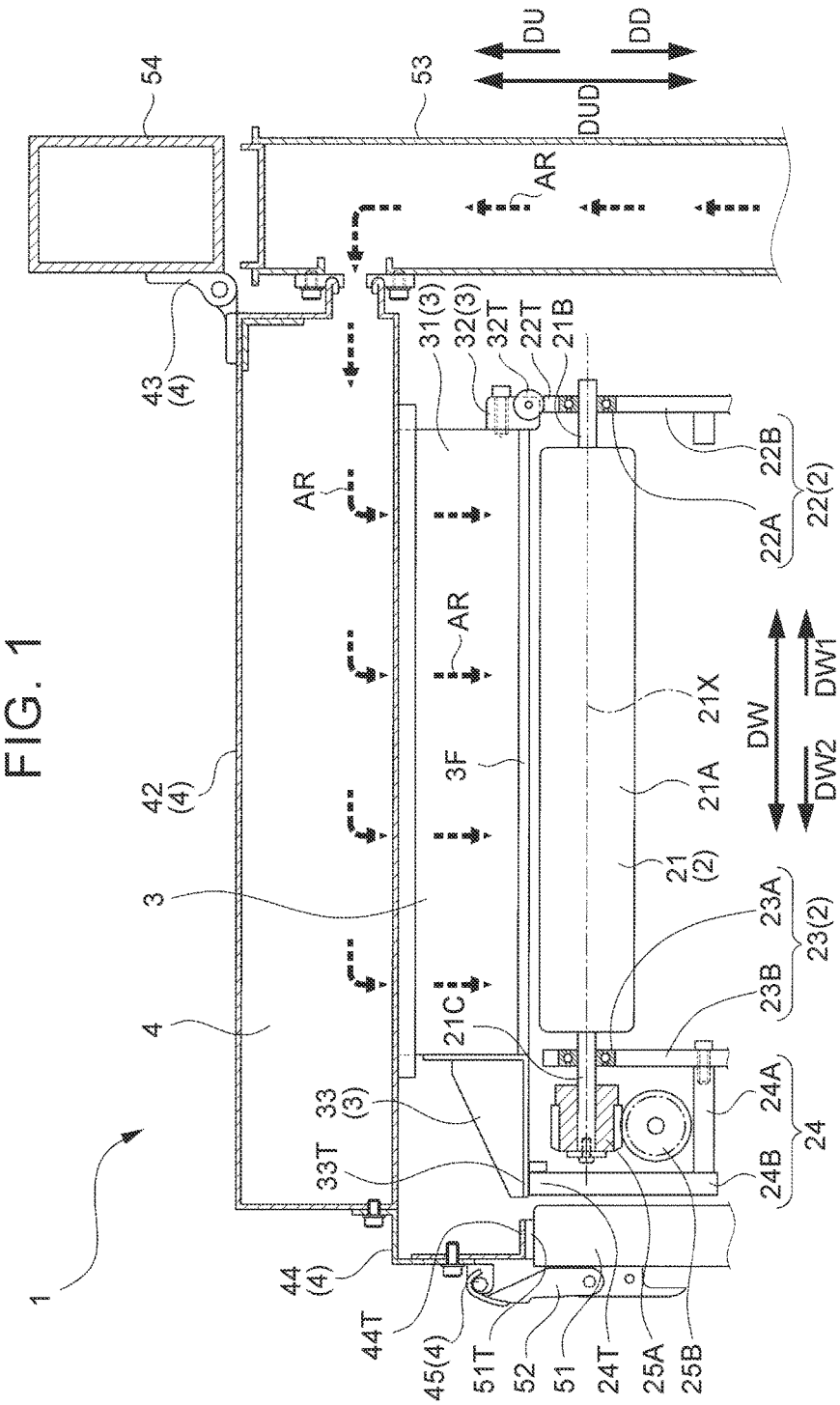
FIG. 1 illustrates a dryer according to an embodiment.

A dryer 1 according to an embodiment will be described with reference to FIGS. 1 to 4. The dryer 1 dries an object HK to be dried with hot air by, as shown in FIG. 2, exposing the object HK to be dried to hot air WD blown through outlets 3F each provided to box bodies 31 of a plurality of blowing boxes 3, while conveying the object HK to be dried in a conveyance direction DH (to the right in FIG. 2) with a plurality of rollers 21 arranged in parallel. Specific examples of the object HK to be dried include an undried positive plate including a positive current collector plate 138 having positive electrode paste that forms a first positive electrode composite layer 131 applied to a top surface 138$b$ of the positive current collector plate 138, or an undried positive plate obtained by drying the positive current collector plate 138 and then further applying positive electrode paste that forms a second positive electrode composite layer 132 on an bottom surface 138$c$ of the positive current collector plate 138, as shown in FIG. 5. It is to be noted that FIG. 5 illustrates a positive plate 130 obtained by forming the positive electrode composite layers 131, 132 on the top and bottom surfaces 138$b$, 138$c$ of the positive current collector plate 138 and then cutting the positive current collector plate 138 in half at the middle in a width direction DB.

Figure 2:
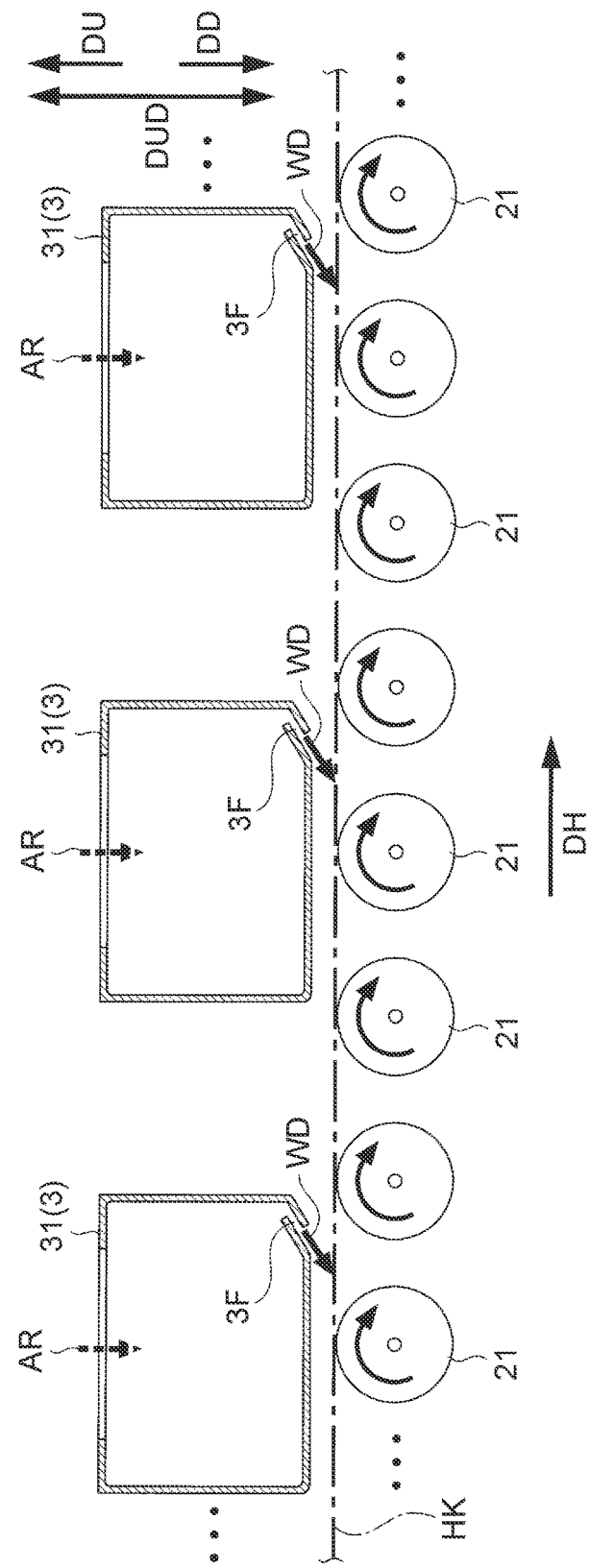
FIG. 2 illustrates conveyance of an object to be dried by the dryer according to the embodiment.
Figure 3:
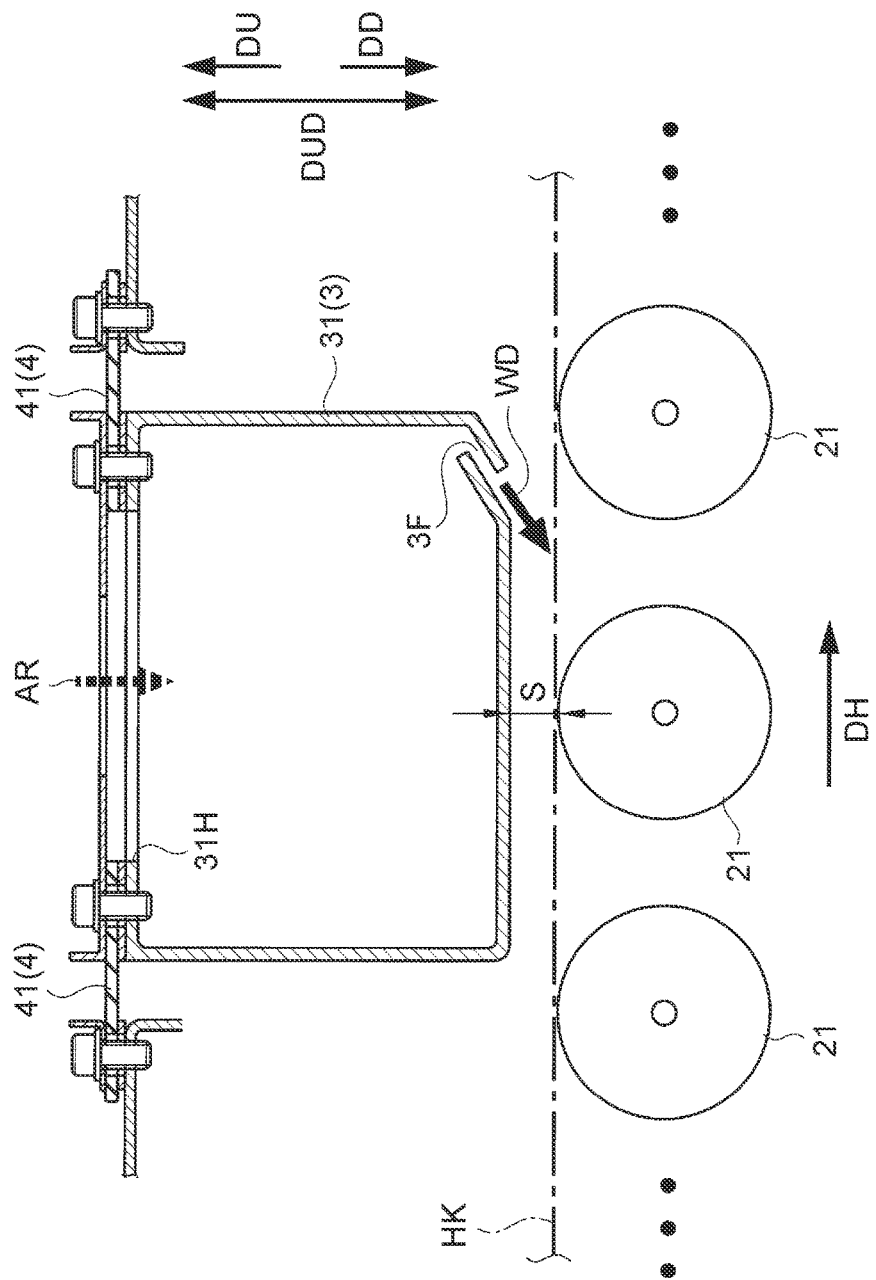
FIG. 3 illustrates the relationship between rollers and the object to be dried, and a box body of the dryer according to the embodiment.

As shown in FIGS. 1 to 3, the dryer 1 includes a loading and conveying unit 2 for loading the object HK to be dried and conveying the object HK in the conveyance direction DH and the blowing boxes 3 arranged above the loading and conveying unit 2. Each blowing box 3 extends in a width direction DW that is orthogonal to a vertical direction DUD and the conveyance direction DH. The blowing box 3 accommodates pumped and heated air AR and has the outlets 3F for blowing out the air AR toward the loading and conveying unit 2 as hot air WD. A cover unit 4 that covers the blowing boxes 3 and the loading and conveying unit 2 is provided above the blowing boxes 3.

First, the loading and conveying unit 2 will be described. The loading and conveying unit 2 includes the plurality of rollers 21 on which the object HK to be dried is loaded and which each have a roller axis 21X extending in the width direction DW, a first supporting portions 22 rotatably supporting one widthwise direction-side end portions 21B (on the right in FIG. 1) of the rollers 21, and a second supporting portion 23 rotatably supporting the other widthwise direction-side end portions 21C (on the left in FIG. 1) of the rollers 21.

Among these components, the rollers 21 each includes a cylindrical roller main body 21A, a first shaft portion 21B extending in one widthwise direction DW1 of the roller main body 21A and forms the one end portion, and a second shaft portion 21C extending in the other widthwise direction DW2 of the roller main body 21A and forms the other end portion. The rollers 21 synchronously rotates about the respective roller axes 21X by rotating a roller driving shaft 25B that engages with roller gears 25A attached to the second shaft portions 21C.

Meanwhile, the first supporting portion 22 includes a bearing 22A that rotatably supports the first shaft portion 21B of the roller 21 and a plate-shaped supporting member 22B that supports the bearing 22A. Accordingly, the supporting member 22B determines positions, in the vertical direction DUD, of the first shaft portion 21B of the roller 21 and a part of the roller main body 21A on the one widthwise direction DW1 side. An upper end part of the supporting member 22B of the first supporting portion 22 forms a first abutted portion 22T against which a first positioning portion 32 of the blowing box 3 to be described later abuts from above.

The second supporting portion 23 includes a bearing 23A that rotatably supports the second shaft portion 21C of the roller 21 and a plate-shaped supporting member 23B that supports the bearing 23A. Accordingly, the supporting member 23B determines positions, in the vertical direction DUD, of the second shaft portion 21C of the roller 21 and a part of the roller main body 21A on the other widthwise direction DW2 side. Thus, the supporting member 22B and the supporting member 23B determine the position of the roller main body 21A in the vertical direction DUD.

A fixed member 24 is fixed to the supporting member 23B of the second supporting portion 23, at a lower portion in the figure. The fixed member 24 is formed by a first fixed member 24A extending from the supporting member 23B in the other widthwise direction DW2 and a second fixed member 24B fixed to a distal end portion of the first fixed member 24A and extending upward. An upper end part of the second fixed member 24B forms a second abutted portion 24T against which a second positioning portion 33 of the blowing box 3 to be described later abuts from above.

Next, the blowing boxes 3 will be described. The blowing boxes 3 each include the box body 31, the first positioning portion 32, and the second positioning portion 33. Among these components, the box body 31 is positioned above the loading and conveying unit 2 and formed in a hollow rectangular prism box shape that extends in the width direction DW, as shown in FIGS. 1 and 3. As will be described later, the box body 31 receives heated air AR pumped via a buffer box 42 of the cover unit 4, through a slit-shaped opening 31H that is long in the width direction DW and accommodates the hot air. A corner portion of the box body 31 in the conveyance direction DH (lower right corner portion in FIG. 3) is configured such that wall portions of the box body 31 overlap with each other with a space therebetween to form the outlet 3F. As a result, the heated air AR accommodated in the box body 31 is blown out through the outlet 3F as hot air WD downward and oppositely to the conveyance direction DH (a down-left direction in FIG. 3). Thus, the hot air WD is blown toward the object HK to be dried loaded across the rollers 21, and thus the object HK to be dried is dried while being conveyed.

The first positioning portion 32 is positioned on one widthwise direction DW1 side of the box body 31 and fixed to the box body 31 (see FIG. 1). The first positioning portion 32 has at its lower end portion a first abutting portion 32T formed by a metal roller supported so as to be pivotable about an axis extending in the conveyance direction DH. The first abutting portion 32T abuts on the first abutted portion 22T of the first supporting portion 22 from above. Thus, a position of the box body 31 in the vertical direction DUD, in particular, a position of a part of the box body 31 on the one widthwise direction DW1 side is determined through the first abutting portion 32T of the first positioning portion 32.

The second positioning portion 33 is positioned on the other widthwise direction DW2 side of the box body 31 and fixed to the box body 31 (see FIG. 1). The second positioning portion 33 is formed in a triangular shape that is tapered in the other widthwise direction DW2, and a tip portion of the second positioning portion 33 forms a second abutting portion 33T. The second abutting portion 33T abuts against the second abutted portion 24T of the fixed member 24 fixed to the second supporting portion 23, from above. In this way, a position of the box body 31 in the vertical direction DUD, in particular, a position of a part of the box body 31 on the other widthwise direction DW2 side is determined through the second abutting portion 33T of the second positioning portion 33.

In other words, the positions, in the vertical direction DUD, of the roller main body 21A of the roller 21 and the object HK to be dried loaded on the roller main body 21A are determined with high accuracy by determining the positions with reference to the first supporting portion 22 and the second supporting portion 23 that support the roller 21 (specifically, the supporting members 22B, 23B of the supporting portions 22, 23). At the same time, the positions of the box body 31 and the outlet 3F of the box body 31 in the vertical direction DUD are also determined with high accuracy by determining the positions with reference to the first and second supporting portions 22, 23. Thus, in the dryer 1, the distance (dimension S) between the roller 21 or the object HK to be dried and the outlet 3F of the box body 31 in the vertical direction DUD is determined with high accuracy across the entire width direction DW, through the common first and second supporting portions 22, 23 (see FIG. 3). As a result, the dimension S can be appropriately sized to dry the object HK to be dried and the object HK to be dried can be dried with an appropriate amount of air. Furthermore, variations of the dimension S in the width direction DW are inhibited, and thus this inhibits variations of dryness of the object HK to be dried in the width direction DW to dry the object HK to be dried uniformly also in the width direction DW.

The cover unit 4 is arranged above the loading and conveying unit 2 and the blowing box 3 to cover the loading and conveying unit 2 and the blowing box 3. The cover unit 4 includes a box-shaped buffer box 42 positioned above the blowing box 3 (box body 31), a front cover member 44 extending forward (in the other widthwise direction DW2, or leftward in FIG. 1) and downward of the buffer box 42, and a locking projection 45 with which a lock to be described later is locked.

The buffer box 42 and the box body 31 communicate with each other through the opening 31H of the box body 31 (see FIG. 3). As shown by arrows in FIGS. 1 and 3, heated air AR that has been pumped through the air-sending member 53 enters the buffer box 42, and then, flows into the box body 31 through the opening 31H. After that, the heated air AR is blown out as hot air WD through the outlet 3F.

The cover unit 4 further includes a hinge 43 that pivotally attaches the buffer box 42 and others to a supporting beam 54. Accordingly, the cover unit 4 is configured to be able to move upward. Specifically, as shown in FIG. 4, the cover unit 4 can be moved upward by unlocking the lock 52 attached to a supporting member 51 from the locking projection 45 and pivoting the cover unit 4 about the hinge 43 so as to open the buffer box 42 and others of the cover unit 4.

Among the components of the cover unit 4, the buffer box 42 is positioned above the blowing box 3 (box body 31), and formed in a box shape. As shown in FIG. 3, the box body 31 is elastically coupled to the buffer box 42 via plate-shaped elastic coupling members 41 that are made of a silicone resin having elastomeric properties. Accordingly, when the buffer box 42 is pulled up, the blowing box 3 including the box body 31 is also lifted by the buffer box 42 (see FIG. 4).

In contrast, when the cover unit 4 (buffer box 42) that has been pulled up is lowered, the descent of the cover unit 4 is stopped (the cover unit 4 is closed) as an abutting portion 44T at a lower end of the front cover member 44 abuts against an abutted portion 51T at an upper end of the supporting member 51. Then, the cover unit 4 is fixed to the supporting member 51 and the supporting beam 54 by locking a tip of the lock 52 to the locking projection 45.

When the cover unit 4 (buffer box 42) is lowered, the blowing box 3 is also moved downward. The second abutting portion 33T at the tip portion of the second positioning portion 33 of the blowing box 3 then again abuts against the second abutted portion 24T of the fixed member 24 fixed to the second supporting portion 23, from above, to determine the position, in the vertical direction DUD, of the part of the box body 31 on the other widthwise direction DW2 side. Also, the first abutting portion 32T at the distal end portion of the first positioning portion 32 of the blowing box 3 abuts against the first abutted portion 22T of the first supporting portion 22 from above to determine the position, in the vertical direction DUD, of the part of the box body 31 on the one widthwise direction DW1 side.

As described above, the dryer 1 is structured such that the box body 31 is elastically coupled to the buffer box 42 via the plate-shaped elastic coupling members 41 (see FIG. 3). In addition, the box body 31, the elastic coupling member 41, and the buffer box 42 are arranged such that the buffer box 42 elastically presses the box body 31 via the elastic coupling members 41 when the cover unit 4 is closed (the abutting portion 44T of the front cover member 44 is abutted against the abutted portion 51T of the supporting member 51).

As described above, the first abutting portion 32T is formed by a metal roller supported so as to be pivotable about the axis extending in the conveyance direction DH. This is in order to alleviate friction between the first abutting portion 32T itself and the first abutted portion 22T when the first abutting portion 32T (metal roller) abuts against the first abutted portion 22T of the first supporting portion 22 while rotating to thereby inhibit changes in the position, in the vertical direction DUD, of the abutment between the first abutting portion 32T and the first abutted portion 22T.

The dryer 1 is structured such that the box body 31 is lifted as the cover unit 4 is moved upward, so that this makes it easy, for example, to inspect the object HK to be dried under conveyance, the rollers 21, or other components and to remove foreign substances.

Meanwhile, when the cover unit 4 is lowered, the first abutting portion 32T of the blowing box 3 again abuts against the first abutted portion 22T of the first supporting portion 22 from above to determine the position, in the vertical direction DUD, of the part of the box body 31 on the one widthwise direction DW1 side. Also, the second abutting portion 33T of the blowing box 3 abuts against the second abutted portion 24T of the fixed member 24 from above to determine the position, in the vertical direction DUD, of the part of the box body 31 on the other widthwise direction DW2 side. This makes it possible to determine the distance (dimension S) between the roller 21, and the box body 31 and the outlet 3F of the box body 31 in the vertical direction DUD with high accuracy.

In addition, because the cover unit 4 is coupled to the box body 31 with the elastic coupling member 41, the first abutting portion 32T of the blowing box 3 and the second abutting portion 33T are respectively abutted against (pressed against) the first abutted portion 22T and the second abutted portion 24T further firmly due to the elastically pressed box body 31, so that the positions of the abutment locations hardly vary. Moreover, because the blowing box 3 (box body 31) is elastically sandwiched between the cover unit 4, and the first abutted portion 22T and the second abutted portion 24T, thereby stabilizing the position of the blowing box 3 and also the position of the outlet 3F of the box body 31. This makes it possible to determine the distance (dimension S) between the roller 21 and the object HK to be dried, and the outlet 3F of the box body 31 in the vertical direction DUD with higher accuracy.

The "rollers" used for the conveyance of the object to be dried may include a driven roller that is rotated by the movement of the object to be dried, in addition to a driving roller that rotates to convey the object to be dried. Among the components of the loading and conveying unit, the "first supporting portion" and the "second supporting portion" include bearing members that rotatably support the end portion of the roller, supporting members that retain the bearing members and support the roller, and a base block of the dryer. The fixed member that is fixed to the first supporting portion or the second supporting portion may be, for example, a metal block that is directly fixed to the first supporting portion and includes the first abutted portion or a metal block that is indirectly fixed to the first supporting portion through another metal block and includes the first abutted portion.

Among the components of the blowing box, the "first positioning portion" and the "second positioning portion" may be formed by fixing separate members from the box body to the box body. Alternatively, parts of the box body may be used as the "first positioning portion" and the "second positioning portion".

Next, a description will be given of the positive plate 130 that is manufactured using the dryer 1 according to the embodiment (see FIG. 5). As shown in FIG. 5, the positive plate 130 is the positive current collector plate 138 that is made of aluminum foil and formed in a strip shape extending in a longitudinal direction DA, and the strip-shaped first positive electrode composite layer 131 and the second positive electrode composite layer 132 that are formed respectively on the top surface 138b and the bottom surface 138c of the positive current collector plate 138 leaving a positive electrode uncoated portion 130b on one side in the width direction DB and extends in the longitudinal direction DA.

The positive plate 130 is manufactured as follows. That is, positive electrode paste is applied to the top surface 138b of the positive current collector plate 138 into a strip shape leaving clearances (positive electrode uncoated portions 130b) on both widthwise end edges (first application step). Next, the positive current collector plate 138 is dried by the dryer 1 with the top surface 138b facing upward to form a first positive electrode composite layer 131 (first drying step). Further, positive electrode paste is similarly applied to the bottom surface 138c of the positive current collector plate 138 into a strip shape leaving clearances (positive electrode uncoated portions 130b) on both widthwise end edges (second application step). Still further, the positive current collector plate 138 is dried by the dryer 1 with the bottom surface 138c facing upward to form a second positive electrode composite layer 132 (second drying step). Then, the positive current collector plate 138 is cut in half at the middle in the width direction DB to provide the positive plate 130 (cutting step, see FIG. 5).

The method of manufacturing the positive plate 130 uses the dryer 1 at the first drying step and the second drying step, so that the distance between the roller 21 and the object HK to be dried (the positive current collector plate 138 having positive electrode paste applied to the top surface 138b, or the positive current collector plate 138 having the first positive electrode composite layer 131 formed on the top surface and also having positive electrode paste applied to the bottom surface 138c), and the box body 31 and the outlet 3F of the box body 31 in the vertical direction DUD is determined with high accuracy across the width direction DW when drying the object HK to be dried. Accordingly, a positive plate 130 can be manufactured that has been dried at appropriate amount of air and temperature in accordance with the distance between the roller (object to be dried), and the outlet of the box body in the vertical direction. In addition, the positive electrode paste can be dried uniformly across the width direction DW to provide a positive plate 130 that has a first positive electrode composite layer 131 or a second positive electrode composite layer 132 that has been dried uniformly across the width direction DW.

The "strip-shaped object to be dried" may be, in other words, a strip-shaped current collector plate on which active material paste is applied into a strip shape, for example. The "stream of air" to be directed toward the object to be dried may be warm air or cold air, in addition to hot air. The "air" to be pumped into the blowing box, therefore, includes low-temperature or unheated air in addition to heated air. A drying method of the drier may be hot-air drying, warm-air drying, and cold-air drying. The outlet of the blowing box may be configured to blow air downward, that is, in a direction orthogonal to the strip-shaped object to be dried. The stream of air may be directed obliquely backward, that is, downward and oppositely to the conveyance direction.

It is apparent that the embodiment is not limited to the above but may be changed as appropriate without departing from the spirit of the embodiment to be applied. Although in the embodiment, the plate-shaped member that is made of a silicone resin is used as the elastic coupling member 41 (see FIG. 3), other materials including rubber materials such as styrene-butadiene rubber (SBR) and chloroprene rubber and metal materials such as spring steel may be used, considering heat resistance from a temperature of the blown air WD. Also, although in the embodiment the elastic coupling member is formed in the plate shape, the elastic coupling member may be in other forms such as a helical spring. Although the method for manufacturing the positive plate 130 has been described, the method may be applied to manufacture of a negative plate having a negative electrode composite layer containing negative electrode active materials.

In the dryer 1 of the embodiment, the first supporting portion 22, out of the components of the loading and conveying unit 2, is configured such that the first supporting portion 22 does not have a fixed member and abuts against the first abutting portion 32T of the first positioning portion 32 of the blowing box 3 at the first abutted portion 22T located at the upper end portion of the first supporting portion 22. On the other hand, the second supporting portion 23 is configured such that the second supporting portion 23 has the fixed member 24 fixed thereto and the fixed member 24 abuts against the second abutting portion 33T of the second positioning portion 33 of the blowing box 3 at the second abutted portion 24T located at the upper end portion of the fixed member 24. The second supporting portion 23, however, may be configured such that the second supporting portion 23 does not have the fixed member 24 and that an upper end portion of the second supporting portion 23 is formed as a second abutted portion. Contrary to this, a fixed member may also be fixed to the first supporting portion 22 and form an upper end portion of the fixed member into a first abutted portion.

What is claimed is:

1. A dryer that dries a strip-shaped object to be dried by directing stream of air toward the object while conveying the object in a conveyance direction, the dryer comprising:
   a loading and conveying unit on which the object to be dried is loaded and which conveys the object to be dried in the conveyance direction, the loading and conveying unit including:
      a roller on which the object to be dried is loaded, the roller having a roller axis extending in a width direction that is orthogonal to the conveyance direction;
      a first supporting portion rotatably supporting an end of the roller on one widthwise direction side; and
      a second supporting portion rotatably supporting an end of the roller on the other widthwise direction side; and
   a blowing box arranged above the loading and conveying unit and extending in the width direction, the blowing box accommodating air pumped into the blowing box, the blowing box including an outlet through which the air is blown toward the loading and conveying unit as the stream of air, the blowing box including:
      a box body positioned above the loading and conveying unit and formed in a box shape extending in the width direction, the box body including the outlet and accommodating the pumped air;
      a first positioning portion including a first abutting portion that abuts against a first abutted portion of the first supporting portion or of a fixed member fixed to the first supporting portion, from above, the first positioning portion determining a vertical position of a part of the box body on one widthwise direction side; and
      a second positioning portion including a second abutting portion that abuts against a second abutted portion of the second supporting portion or of a fixed member fixed to the second supporting portion, from above, the second positioning portion determining a vertical position of a part of the box body on the other widthwise direction side.

2. The dryer according to claim 1, further comprising a cover unit positioned above the loading and conveying unit and the blowing box, the cover unit being configured to cover the loading and conveying unit and the blowing box and to be able to move upward,
   characterized in that the cover unit is configured to lift the box body when the cover unit is moved upward and to elastically press the box body downward when the cover unit is closed.

3. The dryer according to claim 1, further comprising:
   a first plate member arranged between the first abutted portion and the first abutting portion; and
   a second plate member arranged between the second abutted portion and the second abutting portion.

* * * * *